Sept. 2, 1958 E. TRACHTMAN 2,849,949
BROILER
Filed April 11, 1955 2 Sheets-Sheet 1
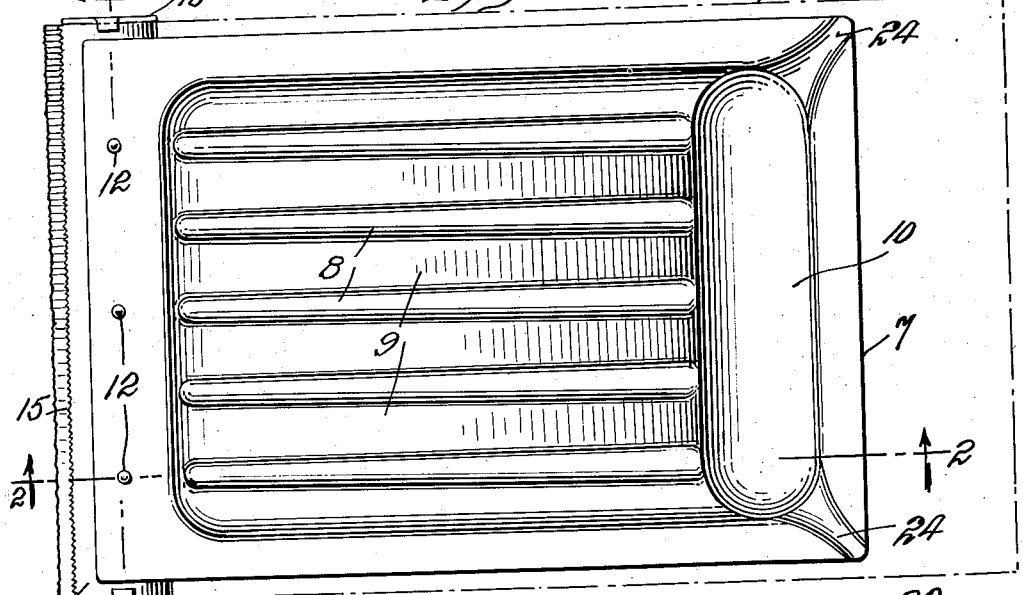
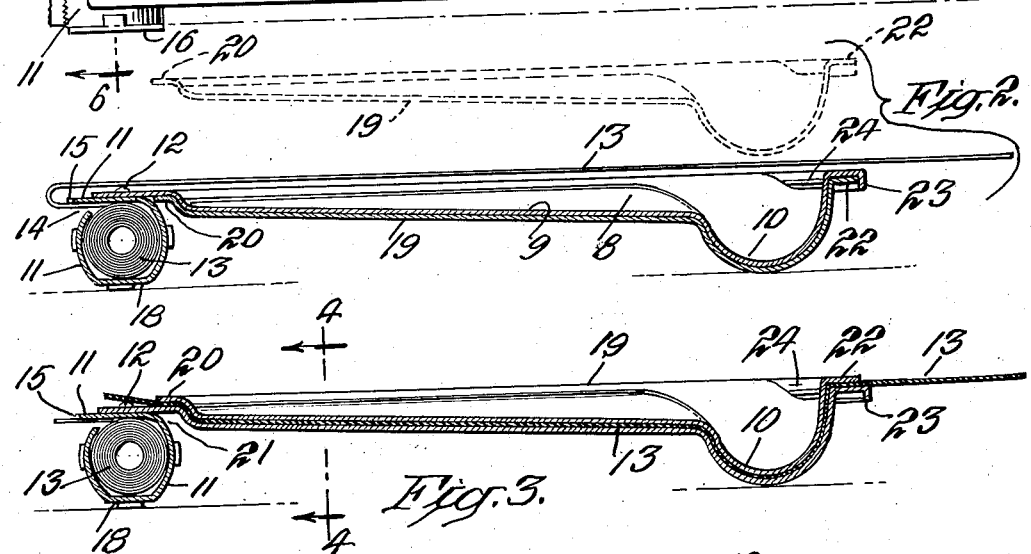
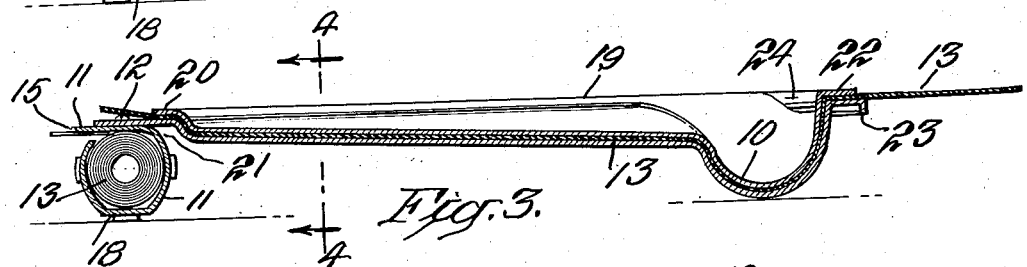
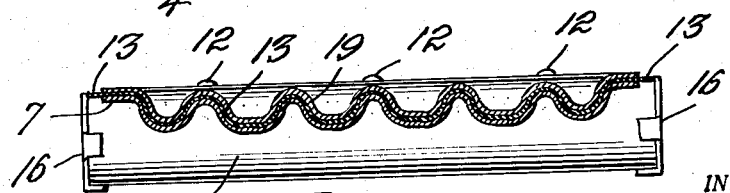
INVENTOR.
EUGENE TRACHTMAN
BY
Philip S. McBean.
ATTORNEY Sept. 2, 1958 — E. TRACHTMAN — 2,849,949
BROILER
Filed April 11, 1955 — 2 Sheets-Sheet 2
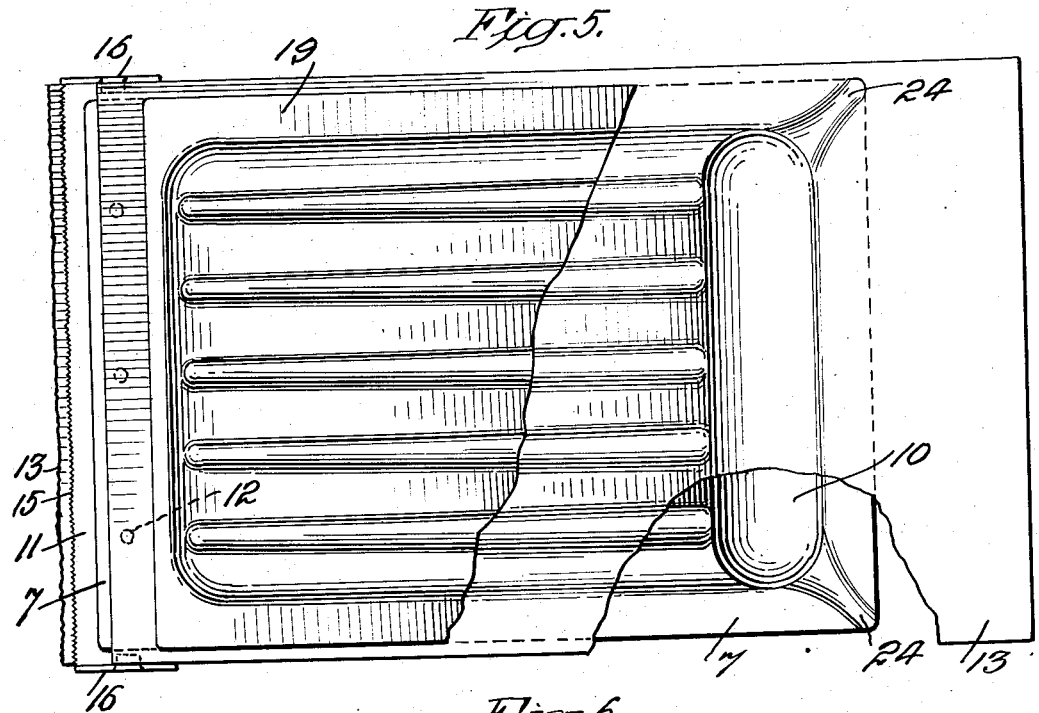
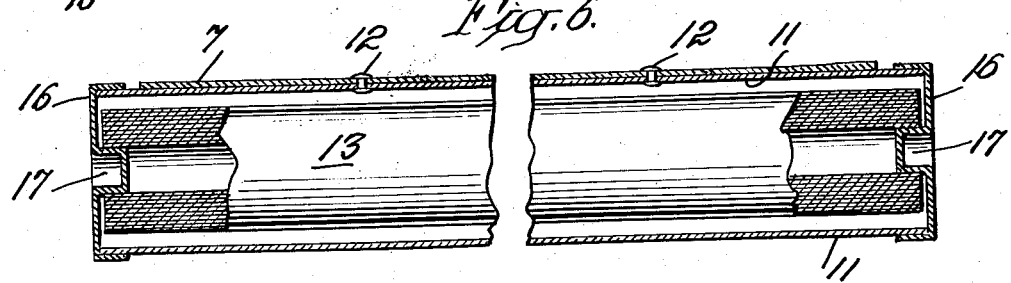
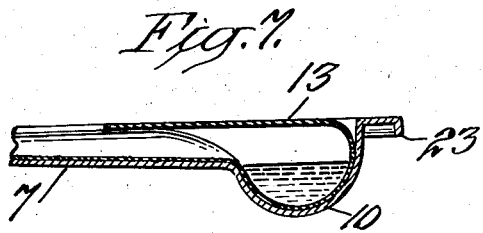
INVENTOR.
EUGENE TRACHTMAN
BY
Philip S. McLean
ATTORNEY

2,849,949
BROILER

Eugene Trachtman, Red Bank, N. J.

Application April 11, 1955, Serial No. 500,627

1 Claim. (Cl. 99—425)

The invention disclosed in this patent application relates to apparatus for effecting cooking operations such as broiling and roasting.

Particular objects of the invention are to provide a practical form of broiler which will not require the scouring and cleaning usually associated with such articles.

These objects are attained in the present invention by the provision of a broiling pan equipped with a supply of metal foil which may be spread over the pan to form the actual cooking surface and then after serving its purpose, be removed and disposed of, leaving the pan clean and ready for later use.

Other special objects of the invention are to provide a device of this character at reasonably low cost and which will be of such simple construction as to be readily usable by anyone desiring broiler service.

Further objects of the invention are to provide a broiler which will be safe and protected against fire from grease collected in the disposable foil cover and in which fresh supplies of the foil may be readily applied.

Further important objects of the invention are to facilitate and enable the foil covering being quickly and easily shaped to the conformation of the pan so as to effect proper support of the material being cooked, drainage of grease and other results of the cooking operatons.

Other desirable objects attained by the invention and the novel features of construction, combinations and relations of parts constituting the invention will appear and are set forth more fully in the course of the following specification.

The drawings accompanying and forming part of the specification illustrate a present preferred embodiment of the invention. Structure, however, may be modified and changed as regards the immediate illustration, all within the true intent and scope of the invention as hereinafter defined and claimed.

Fig. 1 in the drawings is a plan view of the complete grill with broken lines indicating the outline of a length of foil withdrawn from the supply roll and located over the top of the pan;

Fig. 2 is a longitudinal sectional view on substantially the plane of line 2—2 of Fig. 1, showing the foil withdrawn and overlying the pan, before being shaped to the contour of the pan and with the foil shaping form indicated in broken lines in position ready for shaping the foil;

Fig. 3 is a sectional view similar to Fig. 2, showing the form removed from the bottom of the grill and pressed down over the foil in the shaping operation, the foil in this case being indicated as separated from the roll of foil forming the supply at the left;

Fig. 4 is a cross-sectional view on substantially the plane of line 4—4 of Fig. 3;

Fig. 5 is a top plan view of the parts shown in Fig. 3, with the shaping form on top broken away to show the foil beneath it and the foil broken away to show the pan at the bottom;

Fig. 6 is an enlarged broken sectional view of the roll of foil in the holder provided for the same, this view taken on substantially the plane of line 6—6 of Fig. 1;

Fig. 7 is a broken sectional detail showing how the extended portion of foil at the right in Fig. 3 may be folded back as a cover to prevent collected grease from catching fire.

The pan 7 which forms the base or body of the grill may be of any desired shape and size. It is shown as longitudinally ribbed at 8, providing sloping channels 9, draining from the upper end of the grill at the left into a transverse grease collecting well or trough 10 at the right.

The transverse trough portion 10 forms a rest or support for one end of the pan and support for the other end of the pan is provided in the present instance by a tubular container 11 riveted or otherwise attached at 12 beneath the other end of the pan and designed to form a holder for a roll of aluminum or other metal or fireproof foil 13.

The holder 11 is shown as having a longitudinal slot 14 along the upper portion of the same directly below the pan and having at the top a serrated tearing edge 15.

Removable end caps 16 are shown telescopically engaged with opposite ends of the holder tube 11 and these, as indicated in Fig. 6, have inwardly projecting hubs 17 for rotatably supporting the rolls of foil.

Fig. 2 shows how the tubular foil holder may be flattened at the bottom, at 18, to form a firm, solid support for the pan.

Fig. 1 shows in broken lines how a sufficient length of foil 13 may be withdrawn from the holder and laid back over the pan, and Fig. 2 shows this withdrawn length of foil in full lines overlying the pan and ready to be shaped to the contour of the pan.

This shaping of covering foil to the pan may be accomplished by smoothing and pressing it down with the fingers, but it is preferred to use a form such as shown at 19, Figs. 2, 3, 4 and 5, shaped as a counterpart of the pan and arranged to effect the conformation of the foil to the pan by a simple, single pressure operation.

This conforming member 19 may be just a light sheet metal plate shaped to fit the pan. A wood or other suitable form may be employed, since this form normally may be only used to press the foil into shaped condition in the pan.

It is contemplated that the foil shaping form may be left in position on the pan as in Figs. 3 and 4 when the grill is stored away and not in use, particularly so to give the foil a more permanent shaping and to leave the foil shaped on the pan, and the grill ready for instant use as soon as the form is removed. This enables the grill to be put away and to be ready for instant use by simply lifting off the form which has served up to that time as a cover as well as a shaping means for the foil.

Figs. 2, 3 and 5 show how in drawing out the foil an excess amount may be withdrawn beyond the edge of the pan, which may then be thrown back and folded over the grease well as in Fig. 7 to avoid and prevent collected grease from catching fire.

As a possible alternative, a separate cover piece may be provided, large enough to cover the grease well.

The shaped foil cover forms a clean, sanitary and effective cooking surface, ready to be disposed of at the end of the cooking operation to leave the body of the pan fresh and clean, ready for the next use.

The used foil may be severed at the tearing edge 15 either before or after the cooking operation. Usually it is preferred to sever the foil after use, leaving it attached to the roll during use for the benefit gained by the additional holding effect. Also, as indicated in Figs. 1 and 4, it is preferred that the foil be wide enough to extend over the edges of the pan so that, if desired, it may be folded down over these edges to fully cover all portions of the pan and to be thereby more firmly held in place on the pan.

As a matter of convenience the forming pan or tray 19 may be stored beneath the grill, as in Fig. 2, it being shown as having an extended portion 20 at the upper or shallow end to catch over the shoulder 21 provided by the foil container, and an extended portion 22 at the deeper end to fit behind the dependent flange 23 on the end of the pan.

This construction enables the foil shaping tray to be conveniently kept with the pan, to be used whenever necessary.

The pan is shown in Figs. 1 and 5 as having pour-off spouts 24 at the corners of the grease well and the form 19 may be shaped to conform the foil to these spouts.

While the ridged or corrugated form of pan and foil shaper such as shown is usually preferred, it is contemplated that the pan may be of flat, sloping design without grooves or ridges.

What is claimed is:

Broiler for use in the oven of an ordinary cooking stove comprising a longitudinally ribbed broiling pan of a size suitable for placing in an ordinary cooking oven sloping from one end toward the other end and having a depressed transversely extending well at the lower end for collecting grease draining from the upper end of the pan and providing a support for the lower end of the pan, a transversely disposed hollow cylindrical holder beneath the upper end of the pan and providing a support for said upper end, said holder comprising a casing openable for the insertion of a roll of foil therein and having a longitudinal slot in the side of the same adjacent that end of the pan, a roll of foil disposed in said holder and extended outward through said slot and thereby positioned to be withdrawn through the slot and laid over the top of the pan and into said grease collecting well, said holder having a tearing edge for the foil disposed near the slot in the side of the holder for enabling a length of withdrawn foil for covering the pan to be severed from the roll of foil in the holder and a cover for the grease well extended from the lower end of the pan and foldable back over the grease well.

References Cited in the file of this patent

UNITED STATES PATENTS

| | | |
|---|---|---|
| 1,257,234 | Hollands | Feb. 19, 1918 |
| 1,729,292 | McCarthy | Sept. 24, 1929 |
| 2,115,887 | Spilski | May 3, 1938 |
| 2,236,992 | Broadley | Apr. 1, 1941 |
| 2,283,997 | Jensen | May 26, 1942 |
| 2,703,078 | Hammond | Mar. 1, 1955 |